United States Patent [19]

Smojver

[11] Patent Number: 4,843,815
[45] Date of Patent: Jul. 4, 1989

[54] CATALYTIC CONVERSION DEVICE

[76] Inventor: Radmil R. Smojver, 200 Frances Way, Petaluma, Calif. 94975

[21] Appl. No.: 234,418

[22] Filed: Aug. 19, 1988

[51] Int. Cl.$^4$ ............................................. F01N 3/28
[52] U.S. Cl. ...................................... 60/299; 60/295; 422/179; 422/180
[58] Field of Search ................... 60/295, 299; 422/179, 422/180

[56] References Cited

U.S. PATENT DOCUMENTS

| | | | |
|---|---|---|---|
| 3,695,851 | 10/1972 | Perga | 422/179 |
| 3,841,842 | 10/1974 | Wiley | 23/288 F |
| 3,902,853 | 9/1975 | Marsee et al. | 23/277 C |
| 3,963,445 | 6/1976 | Koyama et al. | 23/288 FC |
| 4,163,042 | 7/1979 | Lynch | 422/179 |
| 4,426,844 | 1/1984 | Nakano | 60/295 |

FOREIGN PATENT DOCUMENTS 44398  1/1982  European Pat. Off. ............. 422/180

Primary Examiner—Douglas Hart
Attorney, Agent, or Firm—Limbach, Limbach & Sutton

[57] ABSTRACT

A catalytic converter device is provided for use in connection with internal combustion engines, stationary turbines and steam boilers, in which a plurality of individually framed and mesh-encased catalyst support tiles, are held in a single basket positioned within the body of the catalytic converter. The catalyst support tiles, individually framed and enclosed in steel mesh, enable the use of thin tiles to improve catalyst efficiency and to facilitate routine maintenance of the converter.

2 Claims, 2 Drawing Sheets

CATALYTIC CONVERSION DEVICE

TECHNICAL FIELD

The present invention relates generally to catalytic conversion devices used in combination with internal combustion engines, stationary turbines and steam boilers. The invention relates specifically to a device in which a stack of catalyst support tiles is used to enhance catalyst activity and catalyst handling.

BACKGROUND OF THE INVENTION

The use of precious metal catalysts such as platinum, palladium and rhodium to convert $NO_x$ and CO in effluent gases has generated an industry focused on emission controls. Prior art emission control devices are typically configured to be inserted within the exhaust stream from internal combustion engines, turbines and steam boilers. Ceramic catalyst supports upon which the precious metals are deposited, are provided in bulk. The bulk catalyst support is used to introduce the active catalyst to the gaseous stream which flows through the catalyst support. Due to the varying temperature range experienced under engine operating conditions, there is cyclic expansion and contraction of the ceramic supports. This thermal cycling eventually leads to degradation of the ceramic support, which in turn reduces catalyst activity, and also leads to loose or broken ceramic pieces falling into the engine manifold, with obvious deleterious effects.

The present invention provides a modular approach to catalyst support. Rather than providing a single bulk catalyst, the instant device utilizes a series of catalyst support tiles which are individually structurally supported and which can be individually replaced. According to the present invention, the ceramic catalyst support tiles are provided in preassembled steel frames and the tile faces are encased in steel mesh. This modular approach provides for easy maintenance, increased performance, lower replacement cost, interchangeability and easy adjustments.

Catalytic converters need periodic cleaning to maintain catalyst activity and to minimize any back pressure on the engine resulting from reduced flow capacities in the converter device. The cleaning process consists of removing the ceramic catalyst support and immersing the catalyst support in an acid solution. The present invention, which provides individually contained and structurally sound catalyst support tiles, has significant advantages over bulk catalysts. Since the instant catalyst support tiles are protected by a wire mesh and steel frame, no special holding tools are required to remove the catalyst support for cleaning. Further, the containment system of the present invention permits reuse of ceramic catalyst support tiles which may be broken or cracked. Bulk catalyst supports, on the other hand, must be specially handled, and any broken catalyst support tiles must be replaced.

Individually framing catalyst support tiles also permits the use of a greater range of tile thicknesses. Observed experience demonstrates that most catalytic reactions occur on the catalyst support tile surface. Therefore, catalyst performance is improved by stacking several thinner catalyst support tiles over the same total thickness as would be used in bulk catalyst support systems. The use of steel frames for edge structural support permits use of generally thinner catalyst tiles, at greatly improved overall catalyst efficiency.

During routine maintenance, the present invention also provides for lower replacement cost. Experience has shown that the most permanent contamination is accumulated on the face of the first catalyst tile facing the inlet stream. After a certain period of use, the catalyst support tile has to be replaced due to clogged pores and reduced catalyst activity. The ability to use thinner catalyst support tiles permits replacement of the front catalyst support tile only, at reduced expense compared to the replacement of an unsupported thicker tile, as in the prior art devices.

Further, the modular approach of the instant invention permits interchangeability of the catalyst support tiles. The total quantity of catalyst required to effect conversion is proportional to the volume of exhaust flow from the emission source. Due to the modular approach of the present invention, individually supported tiles can be easily mixed and exchanged from one catalytic conversion unit to another. If it is desired to use the same catalytic converter for a higher flow engine or boiler, capacity can be easily increased by the addition of catalyst support tiles without sacrificing performance. Similarly, catalyst support tiles can be removed to provide for reduced capacities.

SUMMARY OF THE INVENTION

It is an object of the present invention to provide a catalytic converter device containing modular catalyst support tiles.

It is an object of the present invention to provide a modular catalyst support system and catalytic converter which will protect the engine by preventing loose ceramic pieces from falling into the engine manifold.

It is another object of the present invention to provide a catalytic converter which protects against undesirable catalyst loss in the engine exhaust by retaining the catalyst support tiles in a mesh enclosure.

It is a still further object of this invention to provide a catalytic converter which is easy to maintain since the catalyst support tiles which are contained within a structural support are easily handled without need for special tools.

Another object of the present invention is to provide increased catalyst performance by effectively increasing the available surface area of the catalyst presented to the incoming stream.

It is an object of this invention to provide a modular catalyst support tiles to permit replacement of thinner single catalyst support tiles thereby reducing replacement costs.

It is an object of the invention to enhance flexibility of the catalytic converter by enabling the simple addition or reduction of the number of individually supported catalyst support tiles depending upon the volume requirements of the application.

These and further objects of the invention will become apparent to those of ordinary skill in the art by reference to the detailed description and figures which follow.

DESCRIPTION OF THE INVENTION

Figure 1:
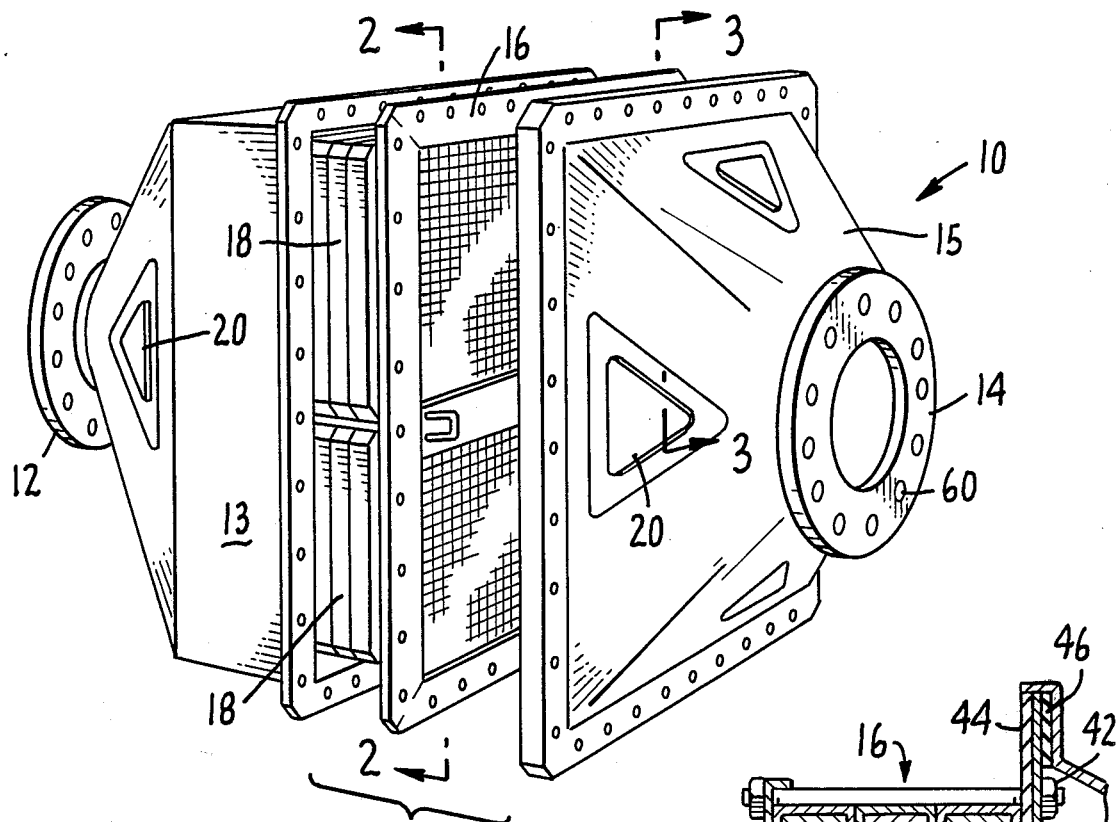
FIG. 1 is a partially exploded perspective view of the catalytic converter of the instant invention.

Referring to FIG. 1, a catalytic converter device 10 is shown in a partially exploded view. An emission inlet 12 is flanged to be connected to an emission source not shown. As previously noted, the present catalytic converter device is adapted to be connected directly to internal combustion engines, stationary turbines and steam boilers. The emission inlet 12 is found at the apex of a quadrilateral-based pyramid which forms an inlet member 13. An emission outlet 14 is found on the other side of the device 10, also at the apex of a quadrilateral-based pyramid which forms an outlet member 15. Catalyst support tile holding basket 16 is received within the rectangular mid-section of inlet member 13. Thus, the catalyst is positioned directly in the flow of the incoming exhaust stream. Typically, the catalyst support is provided as a honeycomb structure. The precious metal is deposited on the internal cell walls, and the exhaust gas is permitted to flow through the honeycomb structure. A variety of honeycomb catalyst supports are commercially available. The selection of the correct ceramic structure, and the precious metal catalyst to be deposited thereon, is a function of the application, including the composition of the exhaust stream to be treated. This selection is within the skill of the ordinary artisan without undue experimentation. See, e.g., 3 McGraw-Hill Encyclopedia of Science & Technology, 6th Edition, "Catalytic Converter", p. 285.

Individually framed catalyst support tiles 18 are fastened in series within the basket 16. Influent and effluent sample probe access ports 20 are provided through the walls of the inlet member 13 and outlet member 15.

It is, of course, recognized that the catalytic converter device 10 must be a pressure vessel in order to ensure the flow of the exhaust from the emission inlet 12, across the catalyst support tiles 18, and out through emission outlet 14. Furthermore, the selection of the material of construction must account for thermal expansion and contraction. In the preferred embodiment, inlet member 13 and outlet member 15 are die-formed from stainless steel with padded seams.

Figure 2:
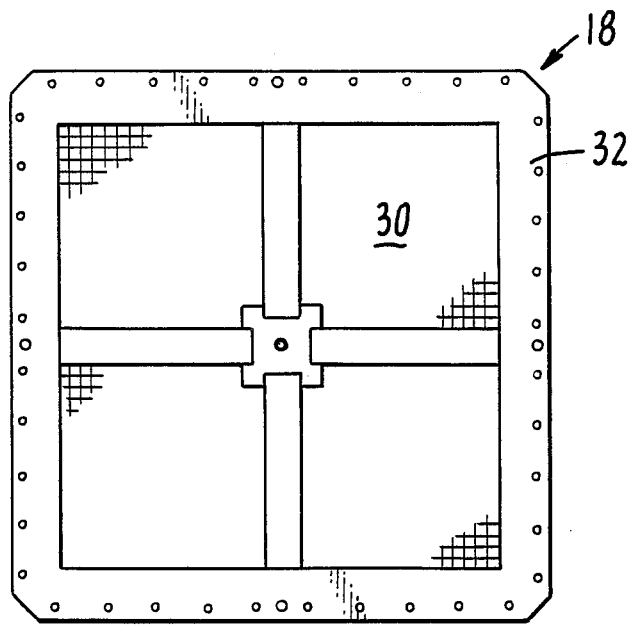
FIG. 2 is an elevational section of the catalyst support tile and frame taken along line 2—2 in FIG. 1.

According to the present invention, a series of individually framed and encased catalyst support tiles can be stacked within the basket 16. One of the most significant advantages of this configuration is that individual ceramic tiles are accessible because they are separately supported and contained within a steel mesh. In a preferred embodiment, an alumina ceramic CORDIERITE is used having 200 cells per square inch. A detailed view of an individual catalyst support tile 18 is shown in FIG. 2. A ceramic honeycomb catalyst support tile 30 is surrounded at its edges by steel frame 32. A wire mesh is positioned between the steel frame 32 and the catalyst support tile 30. The size of the mesh is selected keeping in mind the balance between retaining broken ceramic pieces and creating excess backpressure on the emission source.

Figure 3:
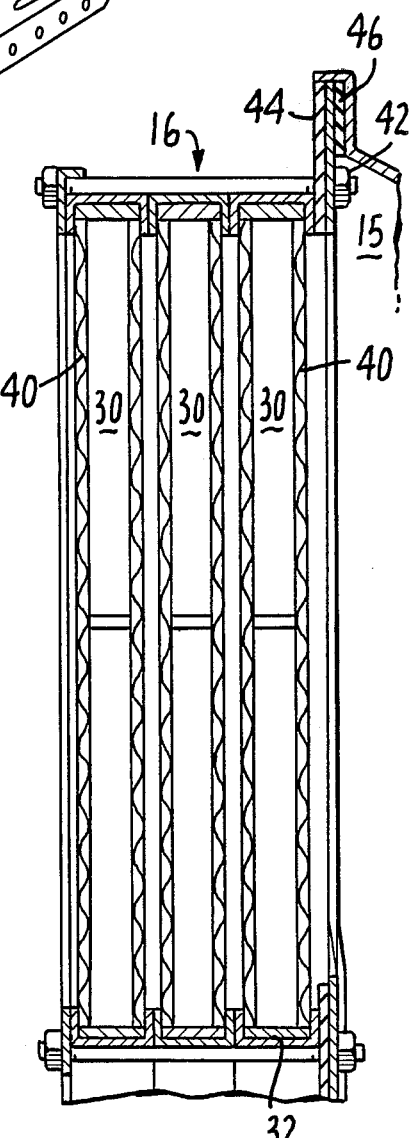
FIG. 3 is an elevational view of a series of catalyst support tiles, taken along the line 3—3 in FIG. 2.

As described above, one of the advantages of the present modular approach is to enable the use of thinner catalyst support tiles because they are structurally supported by metal frames and contained by wire mesh. The stacking or assembly of the individually framed catalyst support tiles 18 within the holding basket 16 is shown in detail in FIG. 3.

In this view the catalyst support tiles 30 are stacked horizontally in basket 16. Wire mesh 40 is provided on each face of the catalyst support tile to contain the ceramic material. Frame supports 32 are also visible in this view. Cadmium plated bolts 42 are used to secure a plurality of catalyst support tiles within the basket 16. As explained previously, the catalytic converter 10 is operated as a pressure vessel. After the basket 16 is inserted into the inlet member 13, high temperature gasket 44 is used to seal the basket to the inlet member 13, and high temperature gasket 46 is used to seal the outlet member 15 to the inlet member 13. In a preferred embodiment, the thermal gaskets are made from proprietary non-asbestos materials available from GASKET SPECIALTY (Emeryville, Calif.).

Figure 4:
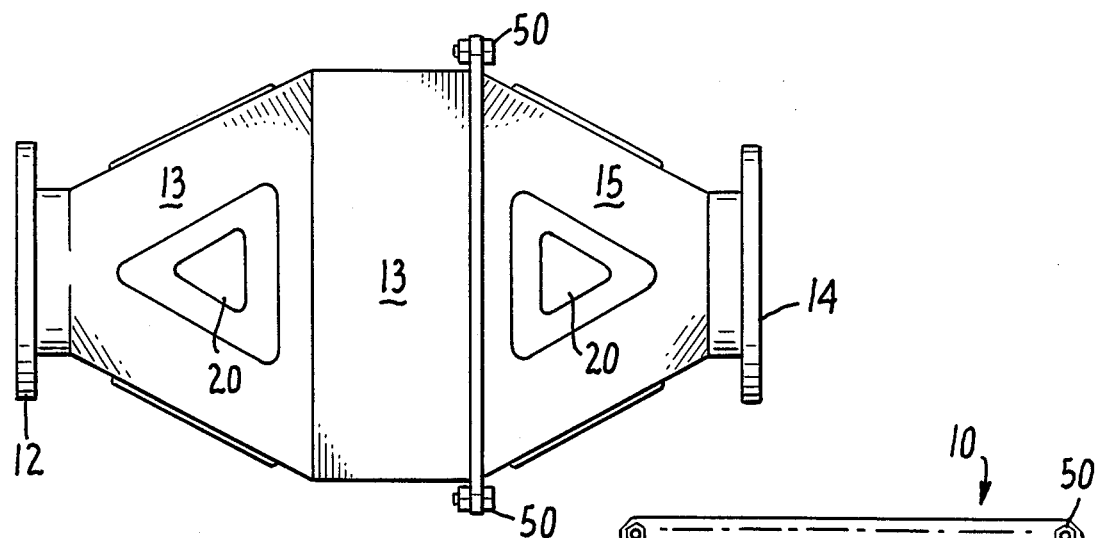
FIG. 4 is a side elevation of the catalytic converter device of the instant invention.

An assembled view of the catalytic converter device 10 is shown in FIG. 4. Emission inlet 12 and outlet 14 are flanged to connect the catalytic converter 10 to the appropriate exhaust manifold and conduit or stack, respectively. The inlet member 13 comprises a rectangular mid section for receiving the holding basket 16 (not shown in this view) and a quadrilateral-based pyramid section. The emission inlet 12 is found at the apex of the inlet member pyramid 13. Sample probe access ports 20 are provided in the inlet member 13 and the outlet member 15. These sample probes are used to determine the temperature and pressure of the flowing exhaust, as well as to provide for compositional measurements of the various streams.

Once the holding basket 16 is inserted into the inlet member 13, bolts 50 are used to secure and to seal the outlet member 15 to the inlet member 13.

Figure 5:
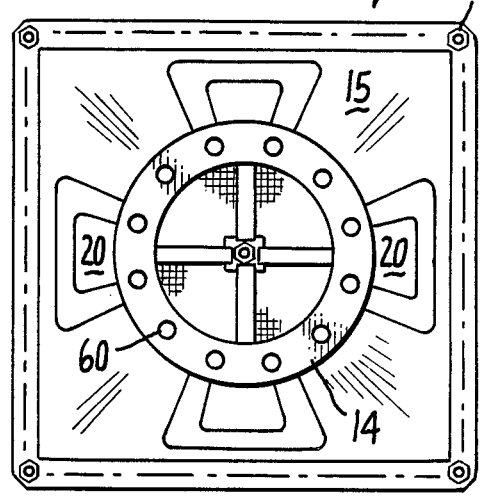
FIG. 5 is an end elevational view of the catalytic converter device from the emission outlet side.

Another view of the converter, from the emission outlet end, is shown in FIG. 5. The catalyst support tiles 30 can be seen inside the converter 10. The emission outlet flange 14 has bolt holes 60 disposed about its circumference. The triangular faces of the outlet member 15 have sample probe access ports 20 disposed about the emission outlet 14.

EXAMPLE

Figure 6:
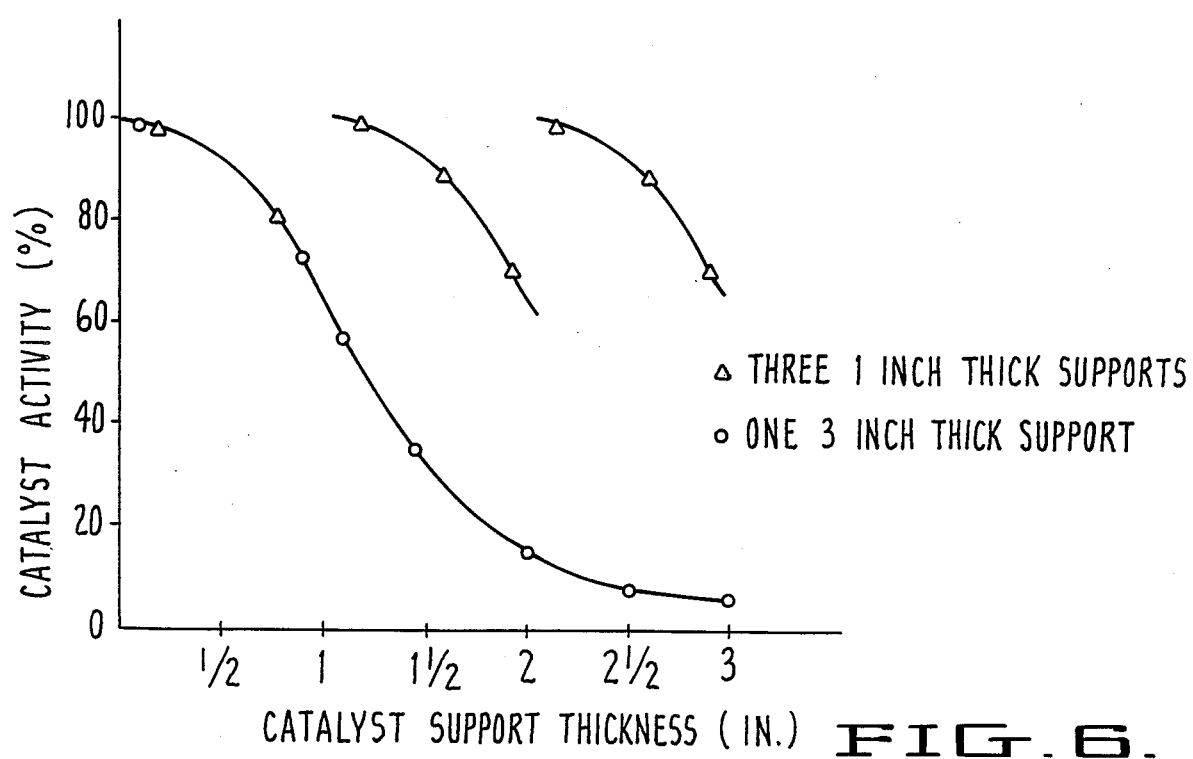
FIG. 6 is a graph of the catalyst activity versus catalyst tile thickness.

In measuring catalyst activity as shown in FIG. 6, an internal combustion engine was connected to a catalytic converter containing CORDIERITE catalyst support, having a honeycomb structure at 200 cells/sq. in. An emission of known composition was fed to the catalytic converter and measurements were made of the influent and influent temperature, pressure, carbon monoxide, total hydrocarbon and $NO_x$ levels. Catalytic activity across the catalyst support was measured by placing thermocouples in the support to detect temperature variations.

Referring now to the performance data represented in FIG. 6, performance efficiency is plotted against catalyst support tile thickness. This graph shows that most of the catalytic reaction occurs on the surface of the catalyst support tile, thus indicating that three one inch titles are more efficient than one three inch tile.

While the invention has been described with reference to a specific embodiment, there are other embodiments and features which are intended to be within the scope of the claimed invention.

I claim:

1. A catalytic conversion device for use with internal combustion engines which comprises:
   (a) a plurality of ceramic catalyst support tiles, each tile having a steel frame on its edges and surrounded on its faces by steel mesh, said plurality of support tiles being secured within a holding basket;
   (b) a converter body inlet member having an emission inlet which is positioned at the apex of a quadrilateral-based pyramid section of said inlet member, aid inlet member further comprising a catalyst tile-holding, basket-receiving, rectangular mid-section, having basket fastening means at an end of said inlet member distal from said emission inlet wherein said basket fastening means are used to fasten said holding basket to said converter body inlet member;
   (c) a converter body outlet member having an emission outlet which is positioned at the apex of a quadrilateral-based pyramid section of said outlet member; and,
   (d) a plurality of high temperature gaskets inserted between said holding basket and said converter body inlet member, and between said holding basket and said converter body outlet member, wherein said catalyst support tile holding basket is received within said converter body inlet member, and said gaskets are positioned about said converter body inlet and outlet members to render the whole catalytic conversion device gas tight.

2. The catalytic converter device as in claim 1 wherein at least one sample probe access port is provided through said inlet member or said outlet member.

* * * * *